United States Patent
Motoki et al.

[11] Patent Number: 5,181,199
[45] Date of Patent: Jan. 19, 1993

[54] PACKET SWITCHING SYSTEM

[75] Inventors: Yuko Motoki, Yokohama; Akinori Honda, Kawasaki; Takashi Morita, Yokohama, all of Japan

[73] Assignee: Hitachi, Ltd., Tokyo, Japan

[21] Appl. No.: 575,689

[22] Filed: Aug. 31, 1990

[30] Foreign Application Priority Data

Aug. 31, 1989 [JP] Japan ................... 1-223038

[51] Int. Cl.$^5$ ............................. H04L 12/56
[52] U.S. Cl. ..................... 370/60; 370/94.1; 370/110.1
[58] Field of Search ......... 370/60, 45.1, 94.1, 370/94.2, 112, 61–65, 66, 58.2, 58.3, 59, 79; 379/219, 220, 234, 269, 242, 93, 94

[56] References Cited

U.S. PATENT DOCUMENTS

| | | | |
|---|---|---|---|
| 4,761,779 | 8/1988 | Nara et al. | 370/60 |
| 4,866,703 | 9/1989 | Black et al. | 370/60 |
| 4,878,216 | 10/1989 | Yunoki | 370/60 |
| 4,922,484 | 5/1990 | Yoshida et al. | 370/110.1 |
| 4,964,119 | 10/1990 | Endo et al. | 370/94.1 |
| 4,977,556 | 12/1990 | Noguchi | 370/94.1 |
| 4,985,887 | 1/1991 | Mizuhara et al. | 370/60 |
| 4,998,248 | 3/1991 | Matsuzaki | 370/110.1 |
| 5,067,125 | 11/1991 | Tsuchida | 370/60 |

OTHER PUBLICATIONS

Kazuo Tuzuki et al., "Packet Switch Configuration in the ISDN Switching", Jul. 21, 1988, pp. 71–75.
Hiromasa Ikeda et al., "Network Systems for ISDN", Aug. 22, 1987, pp. 967–975.

Primary Examiner—Douglas W. Olms
Assistant Examiner—Dang T. Ton
Attorney, Agent, or Firm—Antonelli, Terry, Stout & Kraus

[57] ABSTRACT

A private branch exchange having a comparatively small number of ISDN circuits, in the circuit interface a table is provided for the purpose of conversion between a logical channel lying between ISDN terminal equipment and the private branch exchange and one lying between the private branch exchange and an ISDN network. Such a private branch exchange refers to this table to recognize the correspondence of a user packet between ISDN terminal equipment and the private branch exchange to one between the private branch exchange and an ISDN network in order to perform packet switching on the D-channel. The use of this construction eliminates the need of any packet switching hardware, packet switching transmission line and high speed transmission line for communication between divided processors. Therefore, packet switching on the D-channel is possible without hampering the circuit switching performance of current circuit switching equipment.

10 Claims, 6 Drawing Sheets

| TRANSMISSION DIRECTION | ORIGINATING ADDRESS | DESTINATION ADDRESS | TEI NUMBER | CIRCUIT NUMBER | LCN |
|---|---|---|---|---|---|
| TERMINAL →CIRCUIT INTERFACE | B B B | A A A | 7 | $n_1$ | a |
| CIRCUIT INTERFACE →ISDN NETWORK | B B B | A A A | 0 | $n_5$ | b |

FIG. 3(b)

| TRANSMISSION DIRECTION | ORIGINATING ADDRESS | DESTINATION ADDRESS | TEI NUMBER | CIRCUIT NUMBER | LCN |
|---|---|---|---|---|---|
| ISDN NETWORK →CIRCUIT INTERFACE | A A A | B B B | 0 | $n_5$ | c |
| CIRCUIT INTERFACE →TERMINAL | A A A | B B B | 7 | $n_1$ | d |

FIG. 4(a)

*: BIT FOR CONTROL AND MAINTENANCE
D: D CHANNEL BIT (16 KBPS)
B1, B2: B CHANNEL BITS (64 KBPS)

FIG. 4(b)

*: BIT FOR CONTROL AND MAINTENANCE
B1~B23: B CHANNEL BITS (64 KBPS)
D: D CHANNEL BITS (64 KBPS)

PACKET SWITCHING SYSTEM

BACKGROUND OF THE INVENTION AND RELATED ART

The present invention relates to a packet switching exchange system for private branch exchanges which, during comparatively low traffic of users packet calls, makes possible the packet switching for Integrated Services Digital Network (ISDN) terminal equipment on the D-channel between the terminal equipment and an ISDN, and is particularly concerned with one which, in the case of a private branch exchange separated into a circuit interface and a circuit switching-system control unit, allows the operation of packet switching without hampering the circuit switching performance of the circuit switching-system control unit.

What is called ISDN (acronym for integrated services digital network) provides diversified services with or without the use of telephones in a unified manner on the basis of the digital transmission of information. The feasibility of the integrated services largely depends upon implementing a multipurpose user network interface which can be shared by various services using telephones or no telephones. Such a user network interface may be provided in the International Telegraph and Telephone Consultative Committee (CCITT) recommendations I.410 to I.464, but now there are various interface constructions specified such as, principally, the basic interface and the primary rate interface.

Figure 4A:
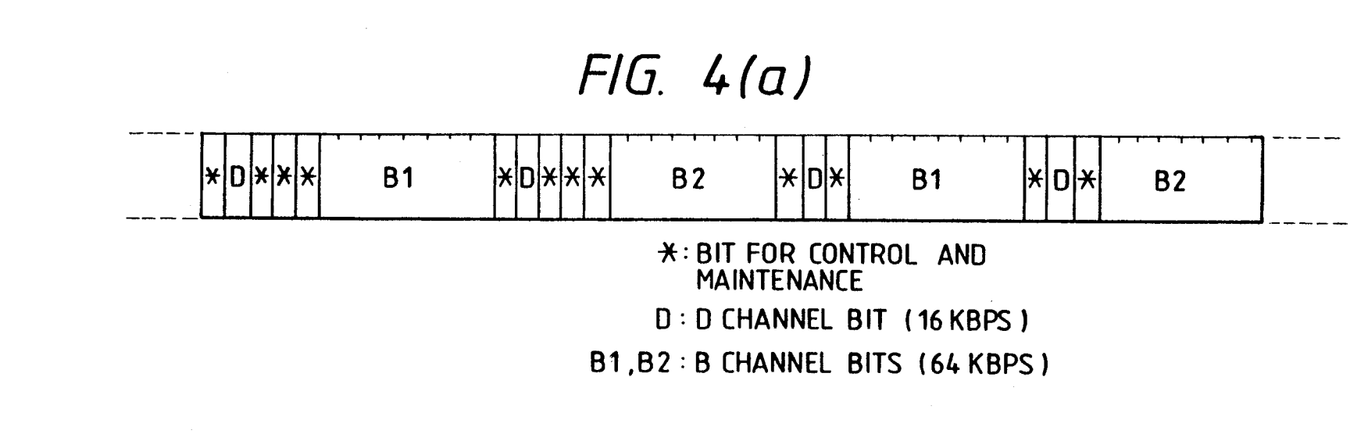
FIGS. 4(a) and 4(b) are views of transmission formats for an ISDN.
Figure 4B:
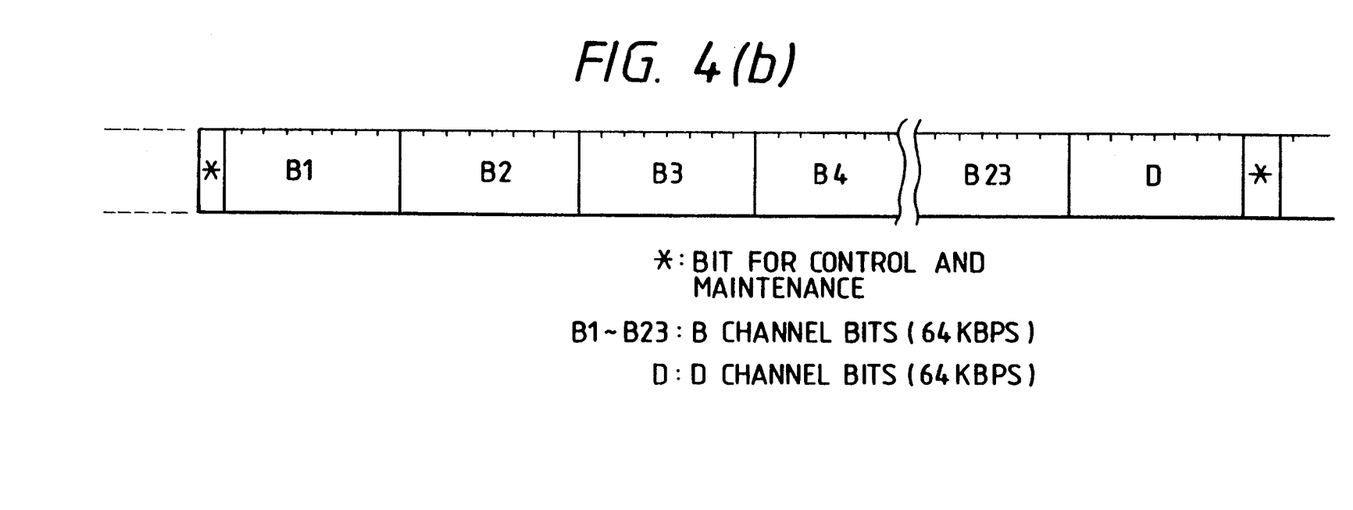

The basic interface and the primary rate interface have such formats on the transmission line as are illustrated in FIGS. 4(a) and 4(b) respectively. The channel construction for the basic interface is 2B+D, namely the number of information channels (B) 2 and that of signal channels (D) 1. The channel construction for the primary rate interface is, for instance, 23B+D, namely the number of information channels 23 and that of signal channels 1. In general, an information channel (hereinafter B-channel) is offered to users for circuit switching communication and packet switching communication, the segment between users and the network being circuit switching communication. A signal channel (hereafter D-channel), on the other hand, is used for packet type transmission of the B-channel distribution control information (which is called "control packet") needed for implementing the communication on the B-channel. The communication between users and the network is carried out by packet switching, and user information of packet type (which is called "user packet") can be directly transmitted. Thus, packet switching is also possible with the D-channel. In packet switching, as shown in the CCITT recommendation X.25, information is divided into blocks of a certain size, and each block is transmitted and switched in a state (called "packet") where destination and control information are added to it. Unlike circuit switching, packets from a terminal are temporarily stored in the exchange, their destination is judged by the exchange and the packets are transferred at high speed to the destination through the network.

Figure 5:
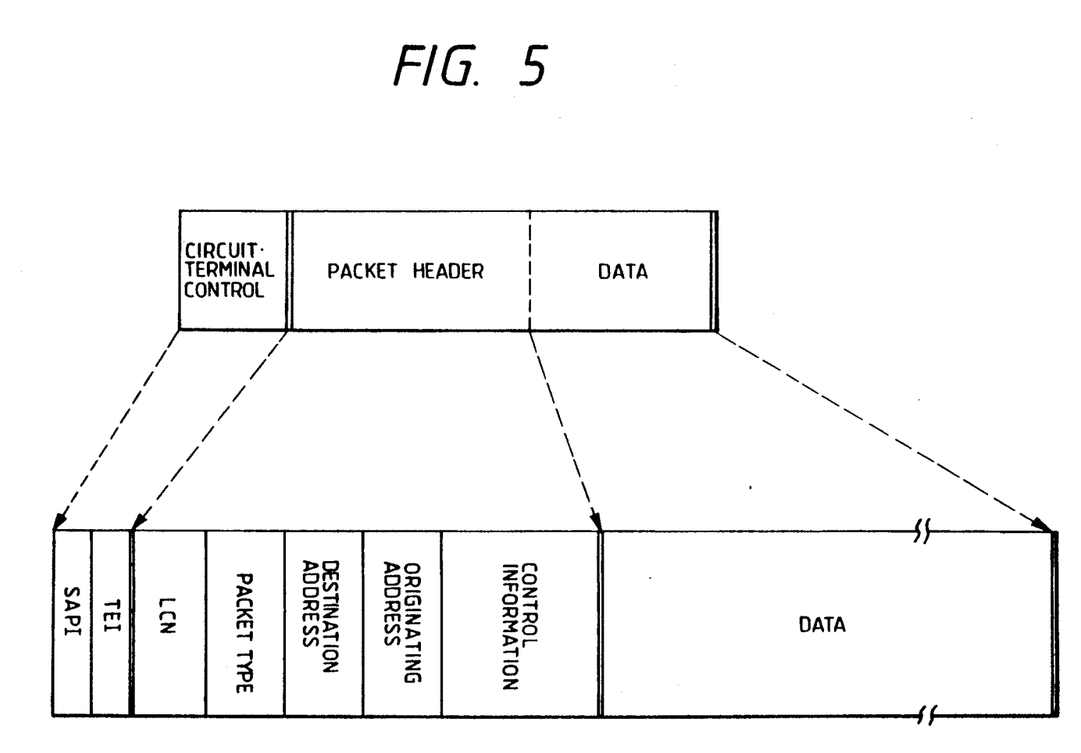
FIG. 5 is a view illustrating the transmission format for a user packet on the D-channel.
Figure 6:
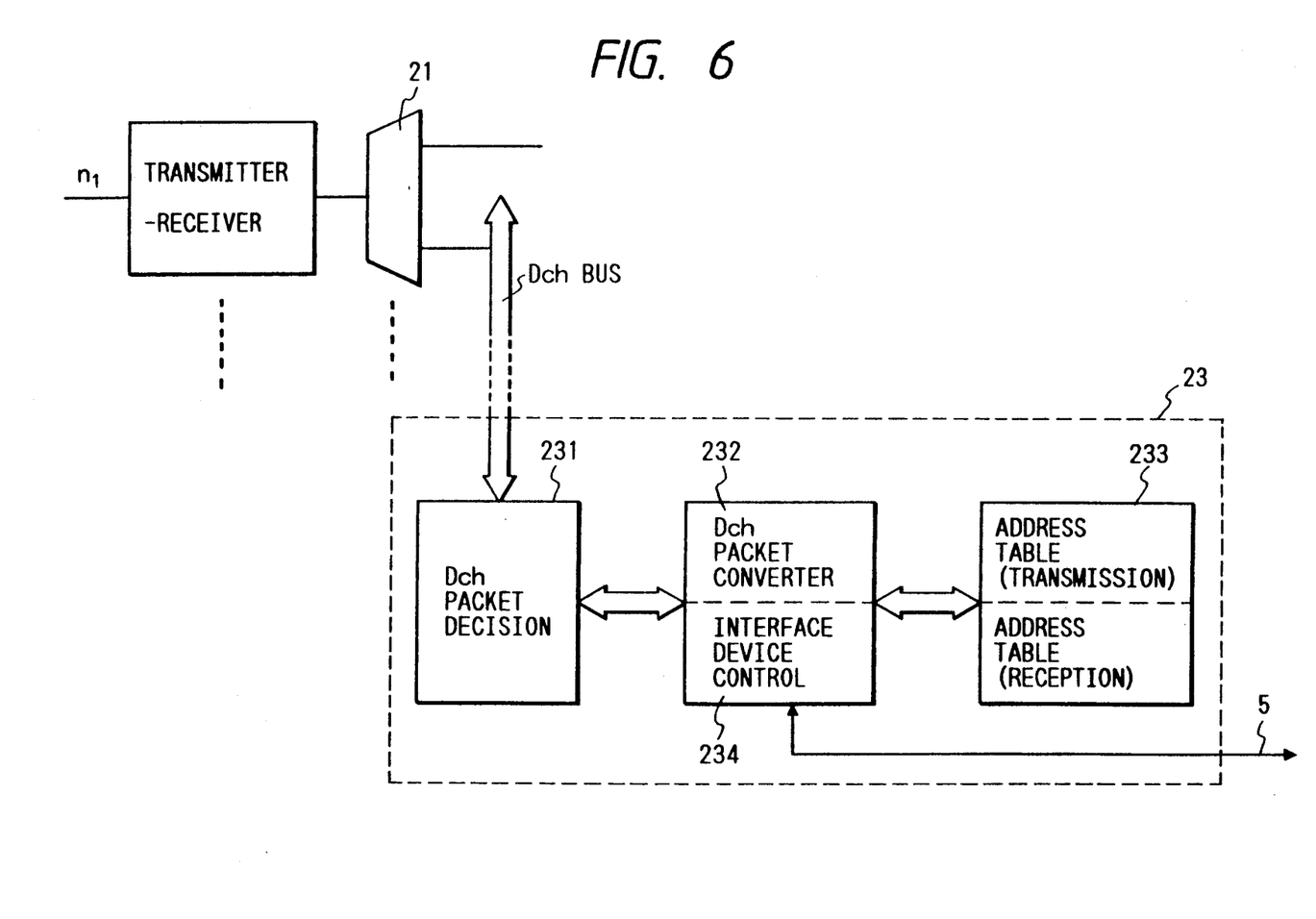
FIG. 6 a view illustrating an embodiment of the structure of a circuit interface.

The user packet on the D-channel has such a transmission format conforming to the CCITT recommendations I.441 and I.462 as illustrated in FIG. 5.

The user packet is composed of data divided into blocks of a certain size, a packet header including the receiving terminal's address necessary for the connection up to the terminal, a number for controlling terminal information for each physical circuit between the ISDN and a terminal accommodated by it and for identifying terminals set up by multipoint distribution and information indicating that it is a user packet. Therefore, despite the physical connection by only one circuit between the ISDN and each terminal, when each terminal set by multipoint distribution sends user packets randomly to more than one receiving station at the same time, each user packet is transmitted after sorted out one by one within the network according to the destination information added to it, with the result that packet transmission is possible with any receiving station. Likewise, packet transmission to any receiving stations is possible on the B-channel by using a single circuit for connection to the ISDN and by sending packets including their destination information from a terminal to receiving terminals.

As understood from above, it is known that within an ISDN user packets can be transmitted by circuit switching on the B-channel and by packet switching on the D-channel as well. Concerning packet switching on the D-channel, there have been such papers as Packet switch configuration in the ISDN switching system (SSE88-76), Society for Telecommunications in Japan pp. 71–75 and network system for ISDN NTT Research and Implementation Report Vol. 36, No. 36 (1987) pp. 967–975. In the D-channel processing section, according to those papers, user packets and control packets related to the B-channel distribution control information are identified and separated. Then user packets are multiplexed and concentrated and are sent along with the B-channel user packet by a packet handler to packet switching equipment where they are processed by packet switching. Therefore, processors in ISDN exchanges usable for packet data are required to identify and separate all user packet calls and control packets. Moreover, the central control unit in a circuit switching system cannot be free from restriction caused by the priority of telephone calls which demand immediate processing. This hinders the use of the same processors for controlling packet data, so the construction of the central control unit is split into packet switching processors connected to a high speed bus and circuit switching processors controlling switching operation and resources. Another difficulty lies in that it is necessary between packet switching processors and packet handlers to transmit at high speed the resource information for the connection of user packet calls.

Assuming the circuit switching method or the packet switching method in which a private branch exchange for circuit switching performs switching between each extension terminal and an ISDN, it has been necessary to use hardware and software special to processing packet calls in addition to those special to circuit switching calls. Moreover, since D-channel and B-channel user packets separated by circuit switching equipment are multiplexed by a packet handler and processed by packet switching equipment, it has been necessary to transmit massive data at high speed. This has been the cause for a limited throughput of a whole system for packet calls.

OBJECT AND SUMMARY OF THE INVENTION

The object of the present invention is to provide a packet switching method in which the multiplexing and separation of user packets on the D-channel and the connection of packet calls and circuit switching calls between an ISDN and ISDN terminal equipment on the D-channel can be performed by a private branch exchange having a comparatively small number of ISDN circuits without hampering the circuit switching performance of current circuit switching equipment, any packet switching hardware, high speed line for packet transmission or high speed line for communication between divided processors being unnecessary.

To achieve the above-noted object, packet switching in the present invention is carried out between ISDN terminal equipment and an ISDN via a private branch exchange, by linking a user packet between ISDN terminal equipment and a private branch exchange to one between the exchange and an ISDN by referring to a table incorporated into the circuit interface for the conversion between the logical channel lying between ISDN terminal equipment and a private branch exchange and that lying between the exchange and an ISDN.

The table to incorporate into the circuit interface for the conversion between the logical channel lying between ISDN terminal equipment and a private branch exchange and that lying between the exchange and an ISDN stores the contents of the address of a packet setting a call and circuit control information. This table allows the address of a received packet to be converted into a specified address.

By means of the present invention, therefore, a private branch exchange having a comparatively small number of ISDN circuits can operate without the need of packet switching hardware, a high speed line for packet transmission or a high speed line for communication between divided processors. In addition, the multiplexing and separation of user packets on the D-channel and the connection of packet calls and circuit switching calls between an ISDN and ISDN terminal equipment can be performed without lowering the circuit switching performance of current circuit switching equipment.

DETAILED DESCRIPTION OF PREFERRED EMBODIMENT

In order to demonstrate the present invention, the following example of the ISDN interface structure being 2B+D is set forth in reference to FIGS. 1 to 3 and FIG. 6. Any assumed specific enumeration like this herein should not be interpreted as a limitation of the invention.

Figure 1:
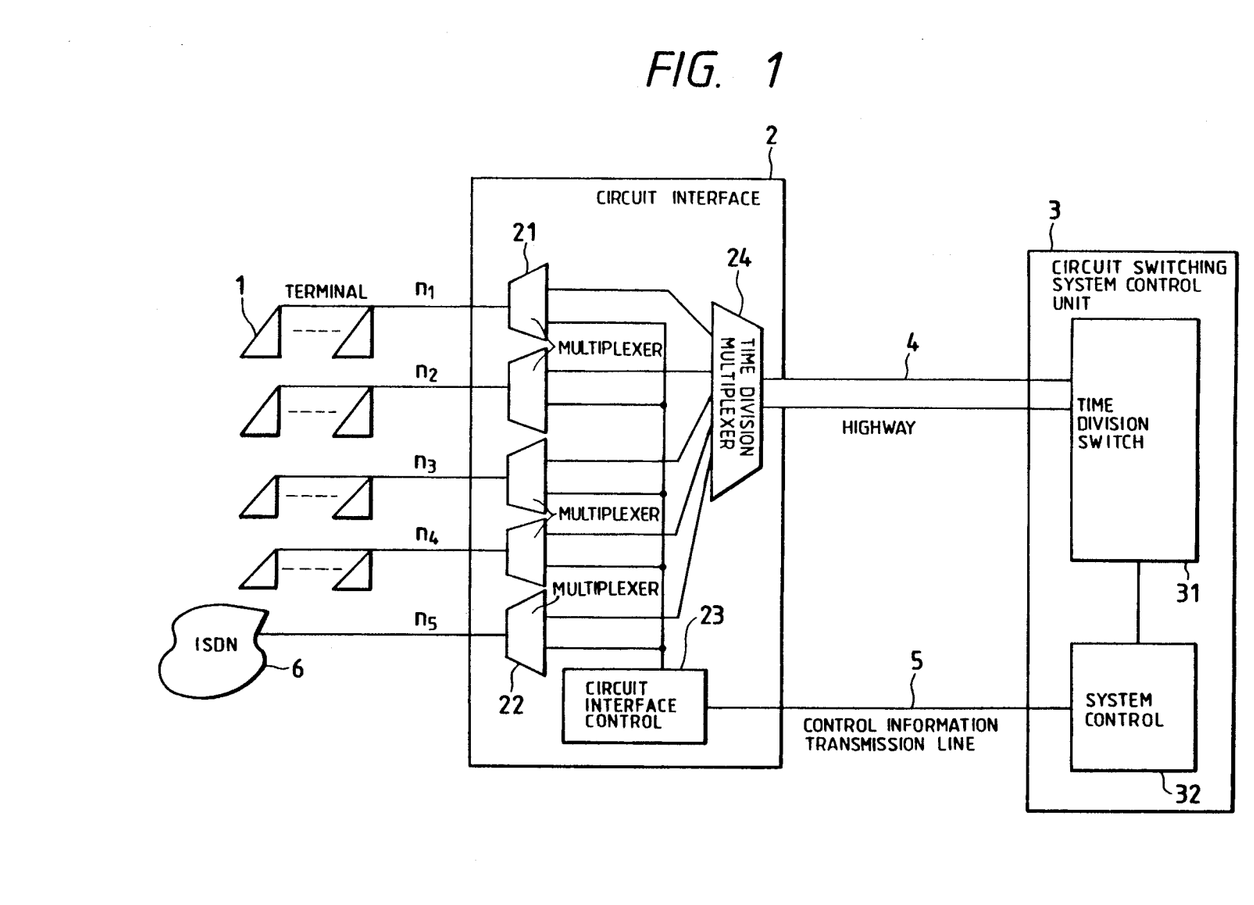
FIG. 1 is a view illustrating an embodiment of the structure of a private branch exchange in accordance with the present invention.

Referring now to FIG. 1, there is shown an example of the construction of a private branch exchange in accordance with the present invention. The private branch exchange is hierarchically structured, composed chiefly of a circuit interface 2 and a circuit switching-system control unit 3. The circuit interface 2 accommodates more than one extension terminal (ISDN terminal) and a public ISDN 6 by way of ISDN interfaces. In this embodiment, extension terminals 1 are accommodated by way of extensions having ISDN interfaces capable of multipoint distribution, and a public ISDN 6 is accommodated by way of a trunk circuit having an ISDN interface for point-to-point distribution. The construction of multipoint distribution is shown in the CCITT recommendation I.430. Namely, a cable for an ISDN extension is connected in bus arrangement to more than one extension terminal. The transmitters on the side of those extension terminals are connected to a receiver on the side of the circuit interface, and the receivers on the side of the extension terminals are connected to a transmitter on the side of the circuit interface both by an interchange circuit. In the construction of point-to-point distribution, on the other hand, a transmitter on the side of an extension terminal is connected to a receiver on the side of the circuit interface by an interchange circuit.

Now for the composition of the circuit interface 2, multiplexers 21 and 22 perform the multiplexing and separation of the B-channel and the D-channel in circuit signals. The circuit interface control 23 may supervise the circuits within the circuit interface device and control a circuit connection in it with the interface device control 234 under a supervision of the circuit state by a control packet for every circuit stored in the circuit interface device and an instruction from the system control 32 to be described later through the control information transmission line 5. The user packet on the separated data bus for D ch is operated such that the D ch packet decision 231 may judge a header of the packet, its address is revised in response to a packet replacing address table to be described later for the user packet, the packet is replaced at the D ch packet converter 232, a packet from the terminal is sent to a network and a packet from the network is sent to a required terminal. D ch packet exchanging address table 233 may pass every call request of packet in view of D ch packet address information, a circuit state information in the interface device control 234 through the control information transmission line 5 and a physical storing location, assure them while a communication is being carried out and apply them for a packet conversion of the data packet. The time division multiplexer 24 applies time division multiplexing to the B-channel information separated by the multiplexers 21 and 22, transmits the information by way of the data transmission highway 4 to the circuit switching-system control unit 3 where data from the data transmission highway 4 is processed with high speed switching in the circuit switching-system control unit 3 in order to be separated and distributes as B-channel data the processed data to a circuit for each sender. As for the composition of the circuit switching-system control unit 3, the time division switch 31 performs circuit switching. The system control 32 controls the resources related to the physical accommodation position of and the number for each circuit accommodated in the circuit interface 2 and to the use of the circuit and performs switching by controlling the time division switch 31. In this composition, the circuit switching is implemented by switching the data transmitted from the time division multiplexer 24 via the data transmission highway 4 by means of the time division switch 31 set and controlled according to the switching distribution control information gained through communication by way of the control information transmission line 5 between the circuit interface control 23 and the system control 32.

Now regarding the circuit switching operation of a private branch exchange in detail, when a call originates from an extension terminal 1, the information from the extension terminal 1 about the receiving terminal's number needed for circuit switching is sent in packet type operation on the D-channel, separated by the multiplexer 21 and received by the circuit interface control 23. Incidentally, the packets on the D-channel are classified into control packets for circuit switching control and user packets including user data. The D channel packet decision 231 judges packets on this. The judgment is performed in conformity to the Service Access Point Identifier (SAPI) provided in the CCITT recommendations I.440 and I.441. The SAPI shows a classification of information transfer services, so when a packet is judged to be a control packet according to the SAPI by the D channel packet decision 231, circuit switching and distribution control information is transferred to the system control 32 through the interface device control 234 and then the time division switch 31 is controlled by the system control 32 to perform circuit switching operation. When a packet is judged to be a user packet, operation is conducted in the following manner.

Figure 2:
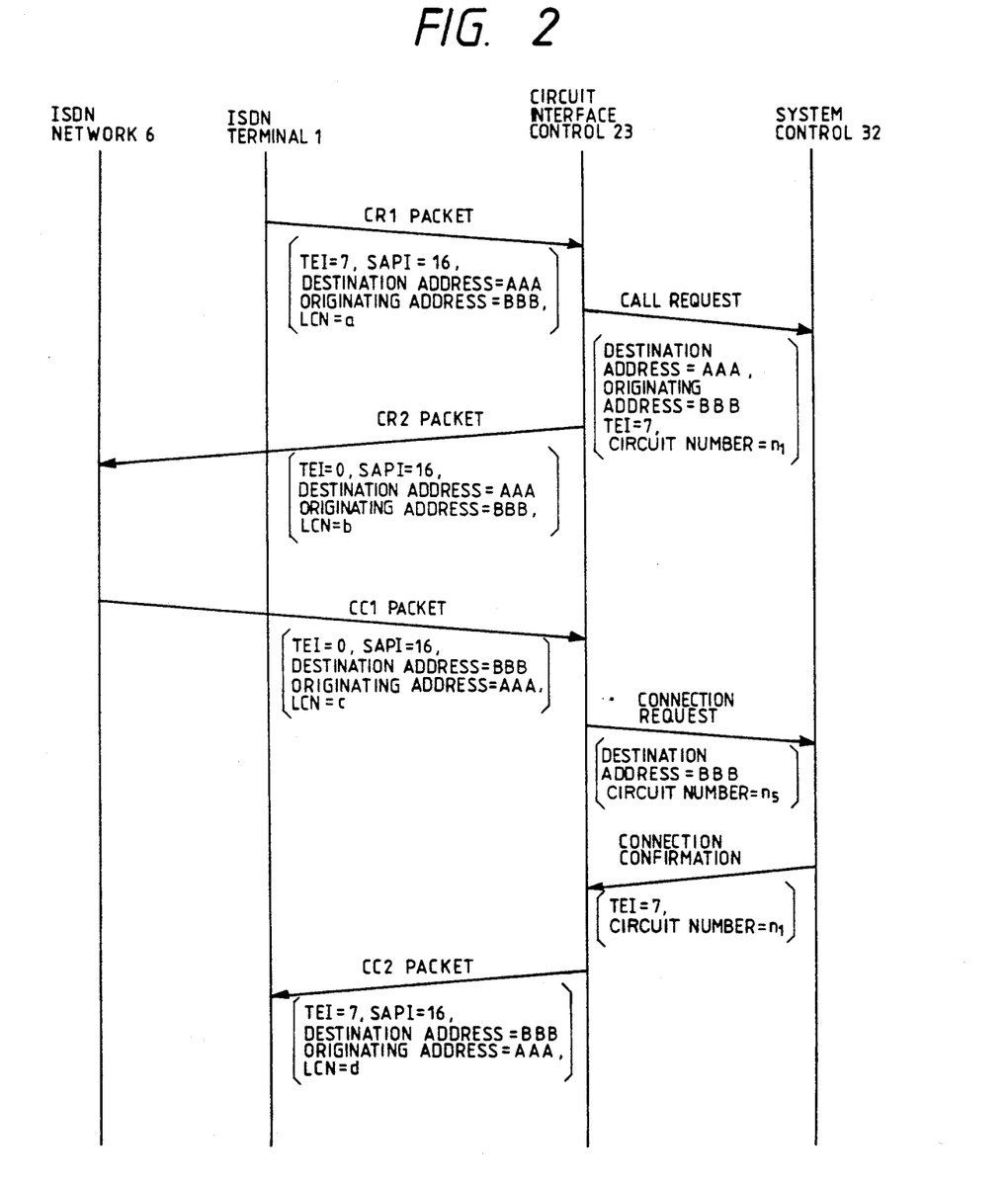
FIG. 2 is a view of one embodiment of a communication means in accordance with the present invention.
Figure 3A:
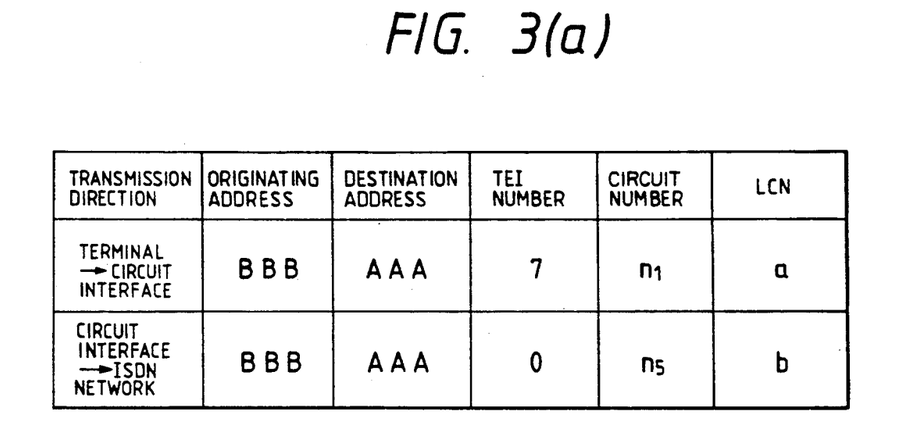
FIGS. 3(a) and 3(b) each are a view illustrating an embodiment of an address conversion table in accordance with the present invention.
Figure 3B:
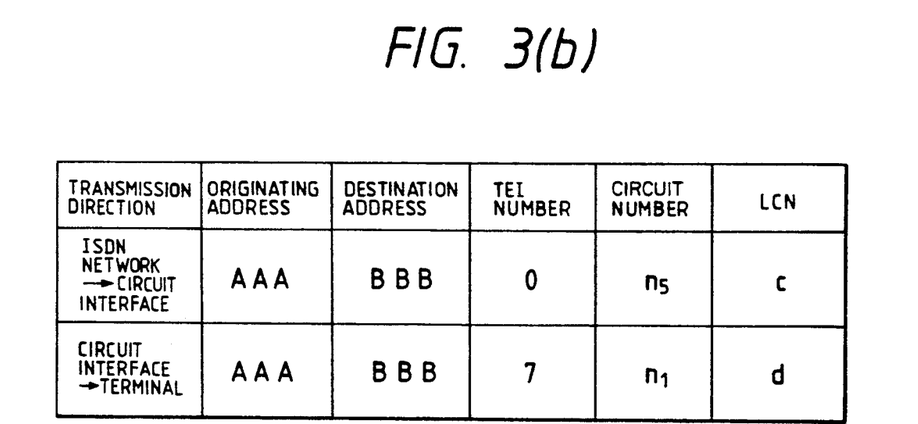

Assuming that the number denoting the physical accommodation position of a circuit in the multiplexers 21 and 22 is circuit number $n_i$ which is unique for the circuit, in the example shown in FIG. 1 the four ISDN interface extensions are provided with circuit numbers, for instance, $n_1$ to $n_4$ and for a station with only one ISDN interface the circuit number $n_5$ is provided. Referring now to FIGS. 2 and 3, the following description is about the operation when a packet is judged to be a user packet by the D channel packet decision 231 in the circuit interface control 23 with the circuit numbers provided in the above manner.

When, as in FIG. 2, a call request packet (CR1 packet) as a request for packet call connection is assumed to be transmitted on the D-channel from an ISDN terminal 1, this packet is recognized by the D channel packet decision 231 in the circuit interface control 23 as a request for calling of a user packet. The CR1 packet contains a number for terminal recognition, that is, a terminal endpoint identifier (TEI) which is defined as address information by the ISDN interface, an SAPI for identifying the packet as a user packet, a destination address for identifying a particular receiving terminal on the basis of the address system of the entire ISDN and a logical channel number (LCN) for identifying particular communication performed between the ISDN terminal 1 calling the packet and the circuit interface 2. Since packet transmission is carried out separately to each destination from each terminal connected to one physical circuit, packets are sorted out according to a data identifier called logical channel. The separate LCN are assigned about each direction of the transmission line. Therefore, once a logical channel corresponding to address information is posted to start packet transmission, afterwards the simple operation of adding the logical channel to data and transmitting it allows the network to recognize the destination. In this embodiment, as illustrated in FIG. 2, it is assumed that the TEI and the SAPI are specified as 7 and 16 respectively, the originating address and the destination address as BBB and AAA respectively, the logical channel number (LCN) used for communication between the ISDN terminal 1 and the circuit interface 2 as a and the number for the physical circuit connected to the ISDN terminal 1 as $n_1$.

The CR1 packet from the ISDN terminal 1 is separated from the D-channel by the multiplexer 21 and transferred from the D channel packet decision 231 on the circuit interface control 23 to the D channel packet converter 232. On the other hand, the interface device control 234 confirm the calling of CR1 from the circuit $n_1$. The circuit interface control 23 uses the resource information in the circuit interface 2 and the address information of the received packet to recognize that the ISDN terminal 1 has requested the calling of a user packet by using the logical channel a on a physical circuit corresponding to the physical circuit number $n_1$ and this information is written on the address table 233. The information included in the address of CR1 at this time is bracketed in FIG. 2. The information written to the address table 233 also at this time is shown in FIG. 3(a). Then the interface device control 234 posts the addresses BBB and AAA, the TEI and the physical circuit number $n_1$ to the system control 32 to perform circuit distribution and system control at the same time. After this, the D ch packet control 234 sends a D-channel call request packet (CR2 packet) for the ISDN network 6 to the multiplexer 22 in order to connect the packet data from the ISDN terminal 1 to the ISDN trunk circuit. The multiplexing of the D-channel and the B-channel by the multiplexer 22 causes the CR2 packet to be sent to the ISDN trunk circuit, when an unused LCN is selected for CR2 from the address table 233 and then used as a logical channel number to be used for the CR2 packet in order to distinguish the LCN from the data of other terminals' D-channel packet transmission going on between the public ISDN network 6 and the circuit interface 2. Therefore, the logical channel of the CR1 packet called from a terminal and that of the CR2 packet correspond to each other in a one-to-one manner, but are not necessarily identical with each other. In this embodiment, such a logical channel is assumed to be b, and the TEI in the CR2 packet to be 0. TEIs, as far as multipoint distribution is concerned, are used for identifying more than one terminal connected to one physical circuit, so there are more than one TEI on the side of ISDN extensions, but there is only one TEI on the side of the ISDN trunk circuit because of its point-to-point distribution. Therefore, the TEI value for the CR1 packet and that for the CR2 packet are not always the same, and in this embodiment that of the CR2 packet is assumed to be 0. As for the originating address and the destination address, they are transmitted in the CR2 packet as they are in the CR1, specified on the basis of the address system of the entire ISDN network. (Though the CCITT recommendation I.462 goes that the transmission of an originating address is arbitrary, in this embodiment it is assumed to be transmitted.) When the CR2 packet is sent from the D ch packet converter 232, as shown in FIG. 3(a), the originating and destination addresses, TEI, circuit number and logical channel are written to the address table 233 to allow the circuit interface control 23 to recognize the correspondence of the CR1 packet to the CR2 packet every time a user packet is connected on the D-channel.

Once the CR2 packet is transmitted to the ISDN trunk circuit, in conformity to the CCITT I recommendations X.25 and I.462, a call connected packet (CC1 packet) is received from the ISDN network by the circuit interface 2 in response to the CR2 packet. At this time also, as shown in the internal table in FIG. 3(b), the same correspondence can be achieved as that shown in FIG. 3(a) to the CC2 packet to be described later.

Namely, the CC1 packet received as a D-channel packet from the ISDN network 6 by the multiplexer 22 is separated from the D-channel by the multiplexer 22, and judged by the D ch packet decision 231, and received by D ch packet converter 232. On the other hand, the interface device control 234 is informed that the packet is received from the circuit $n_5$. The D ch packet converter 232 takes the destination address BBB, and posts to the circuit interface control 23 the information that the call connected packet CC1 has been received from the interface device control 234, and posts to the system control 32 the information that the call connected packet CC1 has been received from the ISDN trunk circuit (circuit number: $n_5$). The system control 32 searches system resource control data for an ISDN terminal having the destination BBB as a originating address and posts to the interface device control 234 the result as verified information that the ISDN terminal is the ISDN terminal 1 having the circuit number 1 and the TEI 7. According to the posted information, the interface device control 234 takes from the CC1 packet its LCN, destination address and TEI as c, BBB and 0 respectively, takes the circuit number $n_5$ from the resource control data and writes all of them to the address table 233 for transmission on the network side. After this, the circuit interface control 23 posts a CC2 packet (converted from CC1 packet) to the ISDN terminal 1 to cause packet transmission between the terminal and the ISDN network 6. The contents of the address in this packet are specified as the information posted by the system control 32, namely the circuit number $n_1$ and the TEI 7 (destination address BBB). On the physical circuit, an idle logical channel is searched for, and the logical channel is selected as d. Then, the contents of the CC2 packet are written to the address table 233 for reception on the terminal side.

Now between the ISDN terminal 1 and the public ISDN network 6 data is sent and received. Data is provided with only a logical channel before sent and received. Therefore, by referring to the address table 233 shown in FIGS. 3(a) and (b) for the D-channel user packet logical channel separated by either the multiplexer 21 or 22, it is possible to immediately identify the TEI and the circuit number and then the destination. By changing the addresses of a received packet according to the FIGS. 3(a) and (b) it is possible to connect packet calls. That is, after table formation in FIGS. 3(a) and 3(b), this logical channel is used in sequence to cause the data packet to be transmitted or received. At this time, since the data packet is provided only with the logical channel, FIG. 3 can be applied and the number of circuits for sending it can be determined and further a conversion of the logical channel can be performed in the same manner as that of the call request packets. Accordingly, even if the data packet is multiplexed from the network and transmitted from one circuit, the reference of this table enables the circuit numbers $n_1$ to $n_0$ at the terminals to convert LCN for every packets to be determined and then a packet multi-communication can be attained. By the conversion of TEIs, logical channels and circuit numbers it is possible to perform packet multiplex communication between more than one ISDN terminal and the public ISDN network via an ISDN trunk circuit.

The description so far has focused on the case of the transmission from extension terminals. But when transmission occurs from an ISDN network, it is also possible by creating a similar table to perform the multiplexing and connection of packets. A brief description about this is as follows.

When a D-channel control packet for requesting reception is received from an ISDN network by the circuit interface control 23 by way of the multiplexer 22, this fact is posted also to the system control 32. The system control 32 uses the destination address given by the control packet to search for the TEI and the circuit number for the ISDN terminal which is to receive the packet. The result of the search is posted to the circuit interface control 23. The circuit interface control 23 searches for an idle logical channel on the physical circuits. When the presence of an idle logical channel is confirmed, the sending of the reception of a D-channel data packet to the ISDN network 6 is posted to the system control 32 in order to respond a connection request from the ISDN network 6. Then, a call request packet (CR packet) on the D-channel is received from the ISDN network 6 by the circuit interface 2. As for the TEI, logical channel and circuit number for the ISDN terminal on the reception side, since a table for transmission on the network side is created based on the CR packet received from the ISDN network 6 by the circuit interface control 23, they can be searched for by the system control 32 by using the destination address included in the table. As for a call receiving packet from the ISDN terminal also, once similar tables are created, packet transmission can be performed by the circuit interface control 23 just referring to the tables to convert addresses.

As understood so far, the creation of and the reference to tables in accordance with the present invention facilitates the multiplexing, connection and switching of D-channel user packets in ISDN interfaces.

We claim:

1. A packet switching exchange system connected to an ISDN network and ISDN terminals for exchanging packet data consisting of D-channel data and B-channel data comprising:

a circuit switching system control unit, having resource data, for controlling said exchange system and exchanging said B-channel data from a highway by circuit switching; and a circuit interface unit, which is connected to the ISDN network and the ISDN terminals, for multiplexing and separating D-channel data and B-channel data sent from said ISDN network and said ISDN terminals according to said control performed by said circuit switching system control unit to send said B-channel data to a highway, and exchanging said D-channel data by packet switching;

wherein said circuit interface unit includes a conversion table for storing contents of address data included in call setting packets conveyed between said ISDN network and said ISDN terminals, an address for a physical circuit of the ISDN network and the ISDN terminals, and logical channel numbers of packets transmitted between the ISDN terminals and the exchange system and between the exchange system and the ISDN network; and wherein after reception of said call setting packet, said circuit interface unit recognizes correspondence of a D-channel user packet transmitted between ISDN terminals and the exchange system to a D-channel user packet transmitted between the exchange system and the ISDN network according to said conversion table and a logical channel number of said D-channel user packet and performs D-channel packet switching.

2. A packet switching exchange system as claimed in claim 1, wherein said conversion table stores numbers for a physical circuit of the ISDN terminals and numbers for identification of ISDN terminals connected to said physical circuit by multipoint distribution corresponding to each of said logical channel number; and
wherein said circuit interface unit recognizes correspondence of the D-channel user packets transmitted between ISDN terminal and the exchange system to D-channel user packets transmitted between the exchange system and the ISDN network.

3. An exchange method of packet switching in a packet switching exchange system, comprising the steps of:
sending a first call setting packet containing a destination address, an originating address and a logical channel number from a calling ISDN terminal equipment to a circuit interface control unit which controls switching of D-channel user packets;
sending in response to said first call setting packet a call request signal carrying said destination address, said origination address and a physical circuit number of said calling ISDN terminal equipment from said circuit interface control unit to a packet switching system control unit having resource data, said packet switching system control unit controls said exchange system, and exchanges B-channel data by circuit switching, said B-channel data being sent from said circuit interface control unit;
storing said destination address, said originating address, said logical channel number of said first call setting packet, and said physical circuit number of said calling ISDN terminal equipment in said circuit interface control unit so that they may correspond to each other;
sending a second call setting packet containing said destination address, said originating address and a logical channel number from said circuit interface control unit via an ISDN network to a receiving ISDN terminal equipment;
storing said destination address, said originating address, a physical circuit number of said ISDN network and a logical channel number of said second call setting packet in the circuit interface control unit so that they may correspond to each other; and
exchanging a D-channel user packet occurring after said call setting packets by packet switching according to correspondence of a D-channel user packet transmitted between said ISDN terminal equipment and said exchange system to a D-channel user packet transmitted between said exchange system and said ISDN network, said correspondence being recognized using data stored by said storing steps, and a logical channel number of said D-channel user packet.

4. A exchange method of packet switching according to claim 3, wherein said call setting packets each contains a terminal end point identifier indicating the identification of ISDN terminal equipment connected to said physical circuit by multipoint distribution, said terminal end point identifier being stored with said logical channel numbers of said call setting packets.

5. An exchange method of packet switching in a packet switching exchange system, comprising the steps of:
sending a first call setting packet containing a destination address, an originating address and a logical channel number from a calling ISDN terminal equipment to a circuit interface control unit via an ISDN network which controls switching of D-channel user packets;
sending in response to said first call setting packet a call request signal carrying said destination address, said origination address and a physical circuit number of said ISDN network from said circuit interface control unit to a packet switching system control unit having resource data, said packet switching system control unit controls said exchange system and exchanges B-channel data sent from said circuit interface control unit by circuit switching;
storing said destination address, said originating address, said logical channel number of said first call setting packet, and said physical circuit number of the ISDN network in said circuit interface control unit so that they may correspond to each other;
sending a second call setting packet containing said destination address, said originating address and a logical channel number from said circuit interface control unit to a receiving ISDN terminal equipment;
storing said destination address, said originating address, said physical circuit number of said receiving ISDN terminal equipment an said logical channel number of said second call setting packet in said circuit interface control unit so that they may correspond to each other; and
exchanging a D-channel user packet occurring after said call setting packets by packet switching according to correspondence of a D-channel user packet transmitted between said ISDN terminal equipment and said exchange system to a D-channel user packet transmitted between said exchange system and said ISDN network, said correspondence being recognized using data stored by said storing steps and a logical channel number of said D-channel user packet.

6. An exchange method of packet switching according to claim 5, wherein said call setting packets each contains a terminal end point identifier indicating the identification of said ISDN terminal equipment connected to said physical circuit by multipoint distribution, said terminal end point identifier being stored with said logical channel numbers of said call setting packet packets.

7. An exchange method of a packet switching in a packet switching exchange system, comprising the steps of:
sending a first call setting packet containing a destination address, an originating address and a logical channel number from a calling ISDN terminal equipment to a circuit interface control unit which controls switching of a D-channel user packet;
sending in response to said first call setting packet a call request signal carrying said destination address, said origination address and a physical circuit number of said calling ISDN terminal equipment from said circuit interface control unit to a packet switching system control unit having resource data, said packet switching system control unit controls said exchange system and exchanges B-channel data which is sent from said circuit interface control unit by circuit switching;

storing said destination address, said originating address, said logical channel number of said first call request packet, and a physical circuit number of said calling ISDN terminal equipment in said circuit interface control unit so that they may correspond to each other;

sending a second call request packet containing said destination address, said originating address and a logical channel number from said circuit interface control unit via an ISDN network to a receiving ISDN terminal equipment;

storing said destination address, said originating address, a physical circuit number of said ISDN network and said logical channel number of said second call request packet from the circuit interface control unit so that they may correspond to each other;

sending a first call connected packet containing said destination address, originating address and a logical channel number from a receiving ISDN terminal equipment via said ISDN network to said circuit interface control unit;

sending in response to said first call connected packet a connection request signal carrying said destination address and said physical circuit number of said ISDN network from said circuit interface control unit to said packet switching system control unit;

storing said destination address, originating address, said logical channel number of said first call connected packet and said physical circuit number of the ISDN network in said circuit interface control unit so that they may correspond to each other;

sending in response to said connection request signal a connection confirmation signal carrying said physical circuit number of said calling ISDN terminal equipment from said packet switching system control unit to said circuit interface control unit, said physical circuit number of said calling ISDN terminal equipment being recognized by said resource data;

sending in response to said connection confirmation signal a second call connected packet containing said destination address, said origination address and a logical channel number from said circuit interface control unit to said calling ISDN terminal equipment;

storing said destination address, said origination address said physical circuit number of said calling ISDN terminal equipment and said logical channel number of said second call connected packet in said circuit interface control unit;

exchanging a D-channel user packet occurring after said call connected packets by packet switching according to correspondence of a D-channel user packet transmitted between said ISDN terminal equipment and said exchange system to a D-channel user packet transmitted between said exchange system and said ISDN network, said correspondence being recognized by user of data stored by said storing steps and a logical channel number of said D-channel user packet.

8. An exchange method of packet switching according to claim 7, wherein said call request packets and said call connection packets each contains a terminal end point identifier indicating the identification of ISDN terminal equipment connected to said physical circuit by multipoint distribution, said terminal end point identifier being stored with said logical channel numbers of said call request packets and said call connected packets.

9. An exchange method of packet switching in a packet switching exchange system, comprising the steps of:

sending a first call request packet containing a destination address, an originating address and a logical channel number from a calling ISDN terminal equipment via an ISDN network to a circuit interface control unit which controls switching of D-channel user packets;

sending in response to said first call request packet a call request signal carrying said destination address, said origination address and a physical circuit number of said ISDN network from said circuit interface control unit to a packet switching system control unit having resource data, said packet switching system control unit controls said exchange system and exchanges B-channel data sent from said circuit interface control unit by circuit switching;

storing said destination address, said originating address, said logical channel number of said first call request packet, and a physical circuit number of said ISDN network in said circuit interface control unit so that they may correspond to each other;

sending a second call request packet containing said destination address, said originating address and a logical channel number from said circuit interface control unit to a receiving ISDN terminal equipment;

storing said destination address, said originating address, said physical circuit number of said receiving ISDN terminal equipment and said logical channel number of said second call request packet in said circuit interface control unit so that they may correspond to each other;

sending a first call connected packet containing said destination address, originating address and a logical channel number from a receiving ISDN terminal equipment to said circuit interface control unit;

sending in response to said first call connected packet a connection request signal carrying said destination address, and said physical circuit number of said receiving ISDN terminal equipment from said circuit interface control unit to said packet switching system control unit;

storing said destination address, said originating address, said logical channel number of said first call connected packet, and said physical circuit number of said receiving ISDN terminal in said circuit interface control unit so that they may correspond to each other;

sending in response to said connection request signal a connection confirmation signal carrying said physical circuit number of said ISDN network from said packet switching system control unit to said circuit interface control unit, said connection confirmation signal being recognized by use of said resource data;

sending in response to said connection confirmation signal a second call connected packet containing said destination address, said origination address and a logical channel number from said circuit interface control unit to said calling ISDN terminal equipment via said ISDN network;

storing said destination address, said origination address, said physical circuit number of said ISDN network, and said logical channel number of said second call connected packet in said circuit interface control unit; and exchanging a D-channel user packet occurring after said call connected packets by packet switching according to correspondence of a D-channel user packet transmitted between said ISDN terminal equipment and said exchange system to a D-channel user packet transmitted between said exchange system and said ISDN network, said correspondence being recognized by use of data stored by said storing steps and a logical channel number of said D-channel user packet.

10. An exchange method of packet switching according to claim 9, wherein said call request packets and said call connected packets each contains a terminal end point identifier indicating the identification of ISDN terminal equipment connected to said physical circuit by multipoint distribution, said terminal end point identifier being stored with said logical channel numbers of said call request packets and said call connected packets.

* * * * *